United States Patent
Howard et al.

(10) Patent No.: US 11,680,558 B2
(45) Date of Patent: Jun. 20, 2023

(54) GRID-FORMING CONTROL OF INVERTER-BASED RESOURCE USING VIRTUAL IMPEDANCE

(71) Applicant: General Electric Company, Schenectady, NY (US)

(72) Inventors: Dustin Howard, Atlanta, GA (US); Einar Vaughn Larsen, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/022,535

(22) Filed: Sep. 16, 2020

(65) Prior Publication Data

US 2022/0082087 A1 Mar. 17, 2022

(51) Int. Cl.
F03D 9/00 (2016.01)
F03D 9/25 (2016.01)

(52) U.S. Cl.
CPC ........ F03D 9/257 (2017.02); *F05B 2270/337* (2013.01)

(58) Field of Classification Search
CPC .... F03D 9/257; F03D 7/048; F05B 2270/337; H02J 3/381; H02J 2300/28
See application file for complete search history.

(56) References Cited

U.S. PATENT DOCUMENTS

| | | | |
|---|---|---|---|
| 5,798,633 A | 8/1998 | Larsen et al. | |
| 7,119,452 B2 | 10/2006 | Larsen | |
| 7,804,184 B2 | 9/2010 | Yuan et al. | |
| 9,270,194 B2 | 2/2016 | Brogan et al. | |
| 9,660,452 B2 | 5/2017 | Routimo | |
| 9,660,453 B2 | 5/2017 | Majumder | |
| 10,156,225 B2 | 12/2018 | Huang et al. | |
| 2010/0142237 A1 | 6/2010 | Yuan et al. | |

FOREIGN PATENT DOCUMENTS

| | | | |
|---|---|---|---|
| CN | 102510120 A | * | 6/2012 |
| CN | 106953365 A | * | 7/2017 |
| CN | 108683198 A | | 10/2018 |

(Continued)

OTHER PUBLICATIONS

CN 110112900 A; English machine translation. 2019. Cheng et al.*

(Continued)

*Primary Examiner* — Julio C. Gonzalez
(74) *Attorney, Agent, or Firm* — Dority & Manning, P.A.

(57) ABSTRACT

A method for providing grid-forming control of an inverter-based resource connected to an electrical grid includes providing, via a processor, at least one virtual impedance value of the inverter-based resource. The method also includes determining a voltage drop across the at least one virtual impedance value of the inverter-based resource using at least one current feedback signal, the voltage drop comprising a voltage magnitude and a voltage angle. Further, the method includes receiving one or more voltage or current signals of the inverter-based resource. Moreover, the method includes determining a control command for the inverter-based resource as a function of the voltage drop across the virtual impedance value(s) of the inverter-based resource and the one or more voltage or current signals.

10 Claims, 11 Drawing Sheets

(56) References Cited

FOREIGN PATENT DOCUMENTS

| CN | 109494709 A | | 3/2019 |
|---|---|---|---|
| CN | 110112900 A | * | 8/2019 |
| EP | 2523298 B1 | | 11/2012 |
| WO | WO2015131958 A1 | | 9/2015 |

OTHER PUBLICATIONS

CN 106953365 A; English machine translation. 2017. Feng et al.*
CN 102510120 A; English machine translation. 2012. Guan et al.*
Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957
European Search Report for EP Application No. 21194041.6, dated Feb. 9, 2022.
Gao Yu et al., Resonance Damping of DFIG System Based on Multi-branch Virtual Impedance, 2019 IEEE International Conference on Industrial Technology (ICIT), IEEE, Feb. 13, 2019, pp. 527-532.
Haukun Liu et al., Mitigation of SSR by embedding subsynchronous notch filters into DFIG converter controllers, IET Generation, Transmission & Distribution, IET, UK, vol. 11, No. 11, Jul. 24, 2017, pp. 2888-2896.
Wang Xiongfei et al., Grid-Synchronization Stability of Converter-based Resources—An Overview, IEEE Open Journal of Industry Applications, IEEE, vol. 1, Aug. 31, 2020, pp. 115-134.

\* cited by examiner

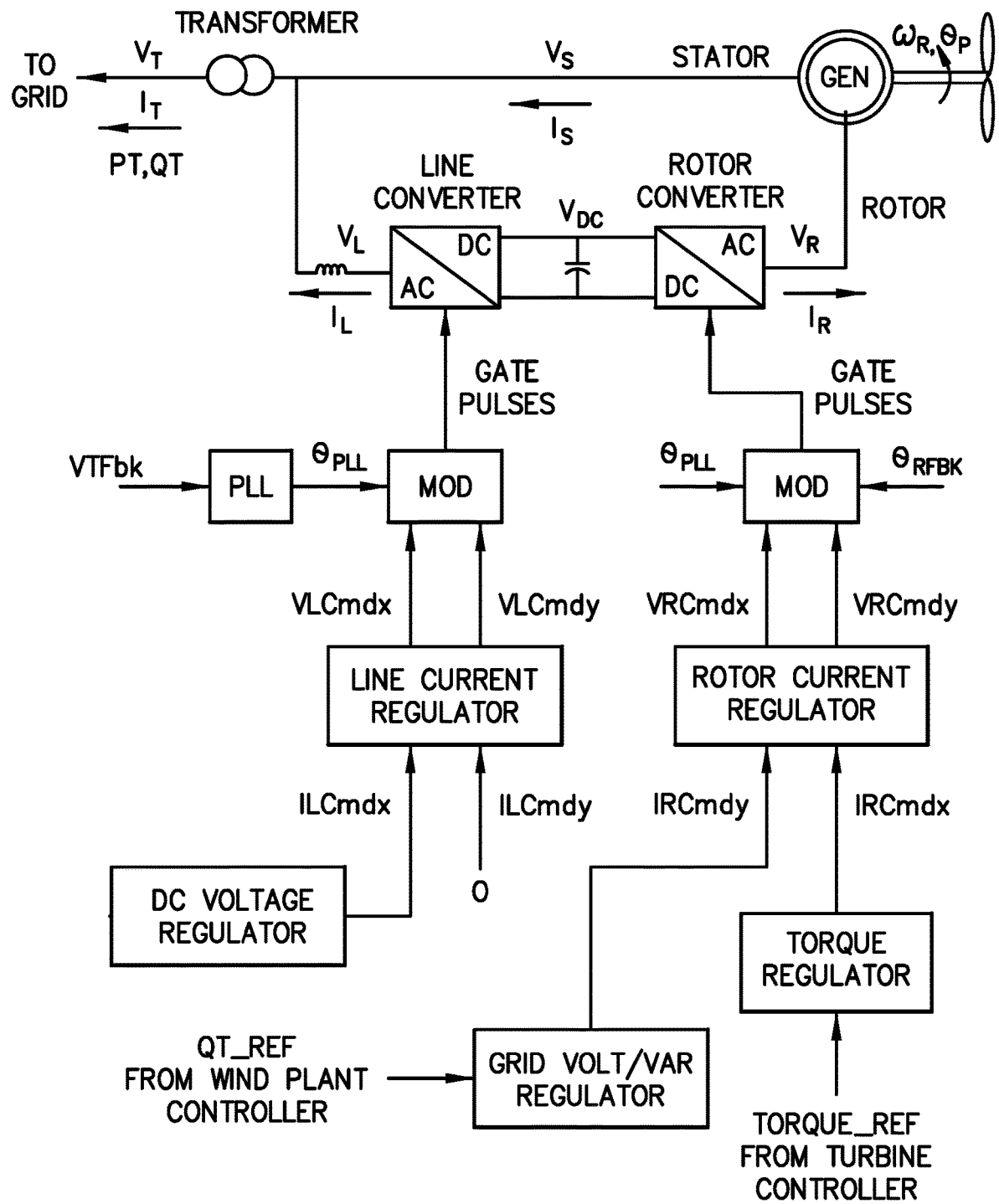
FIG. -1-
PRIOR ART

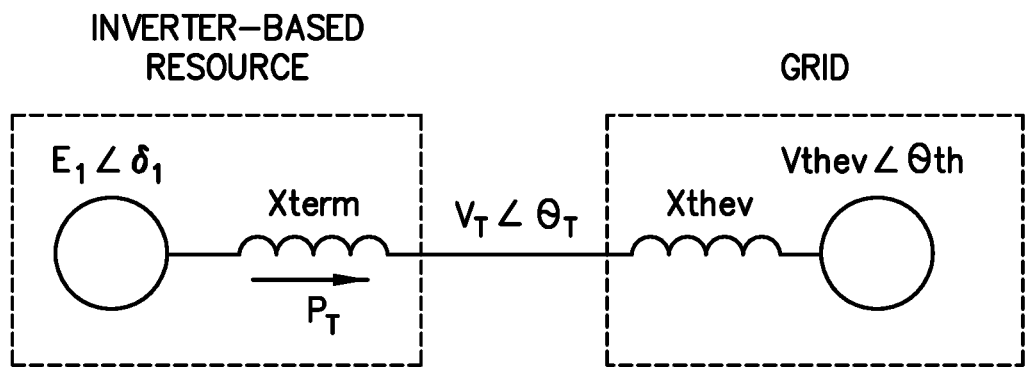
FIG. -2-
PRIOR ART
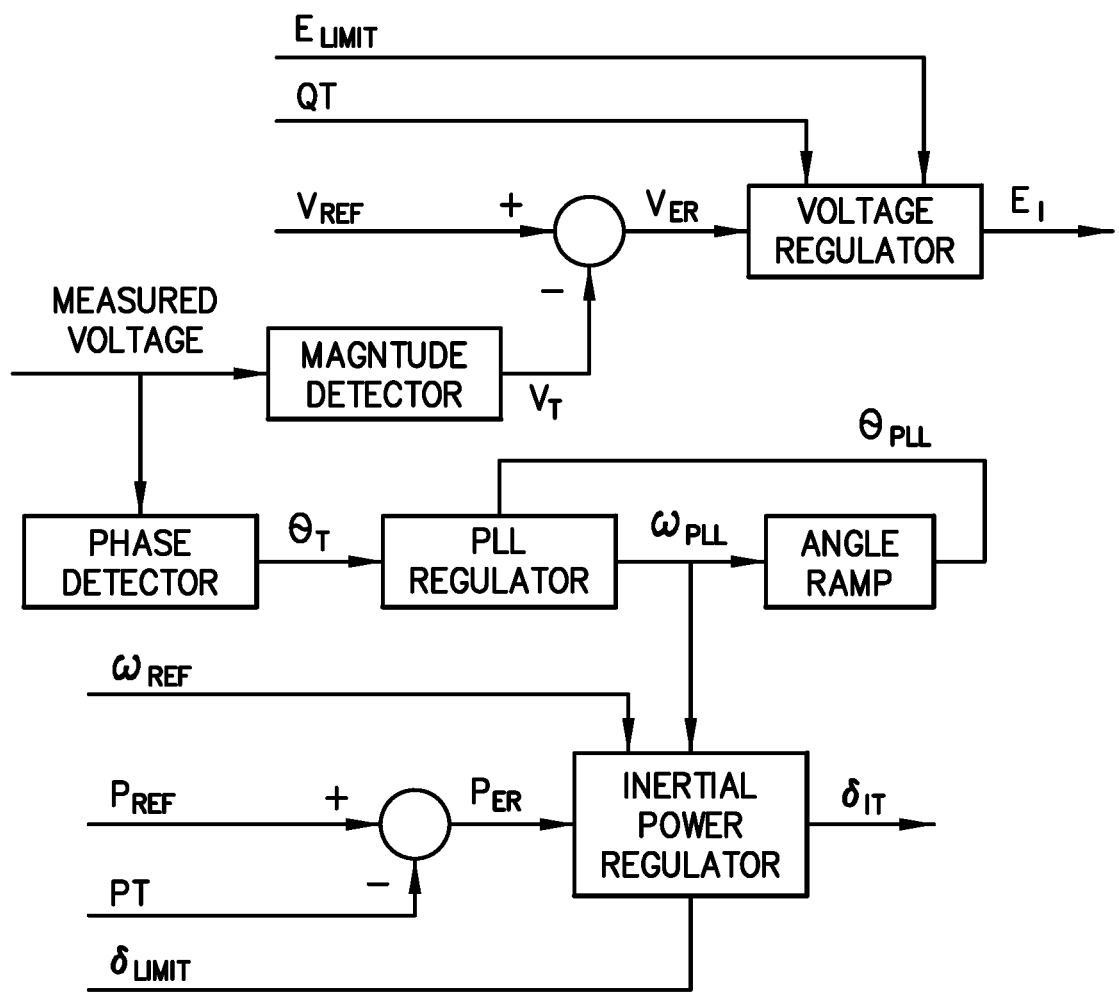
FIG. -3-

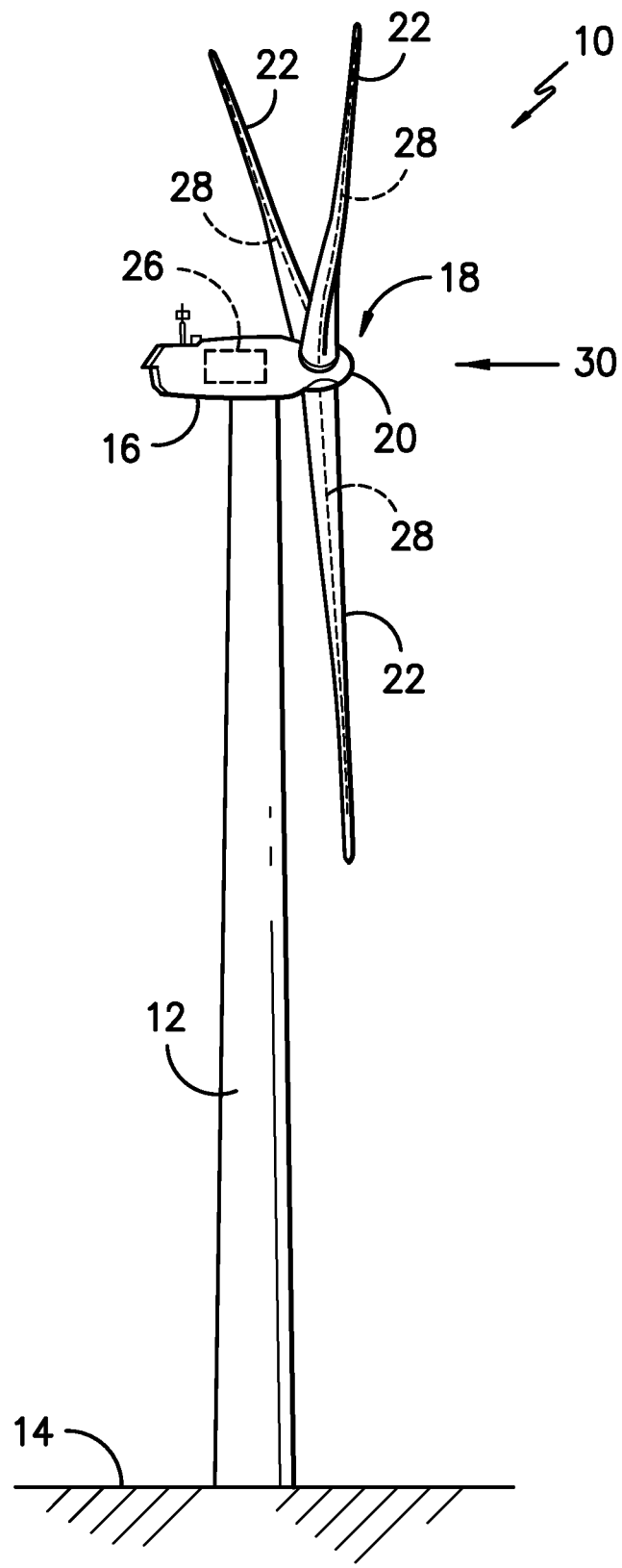
FIG. -4-

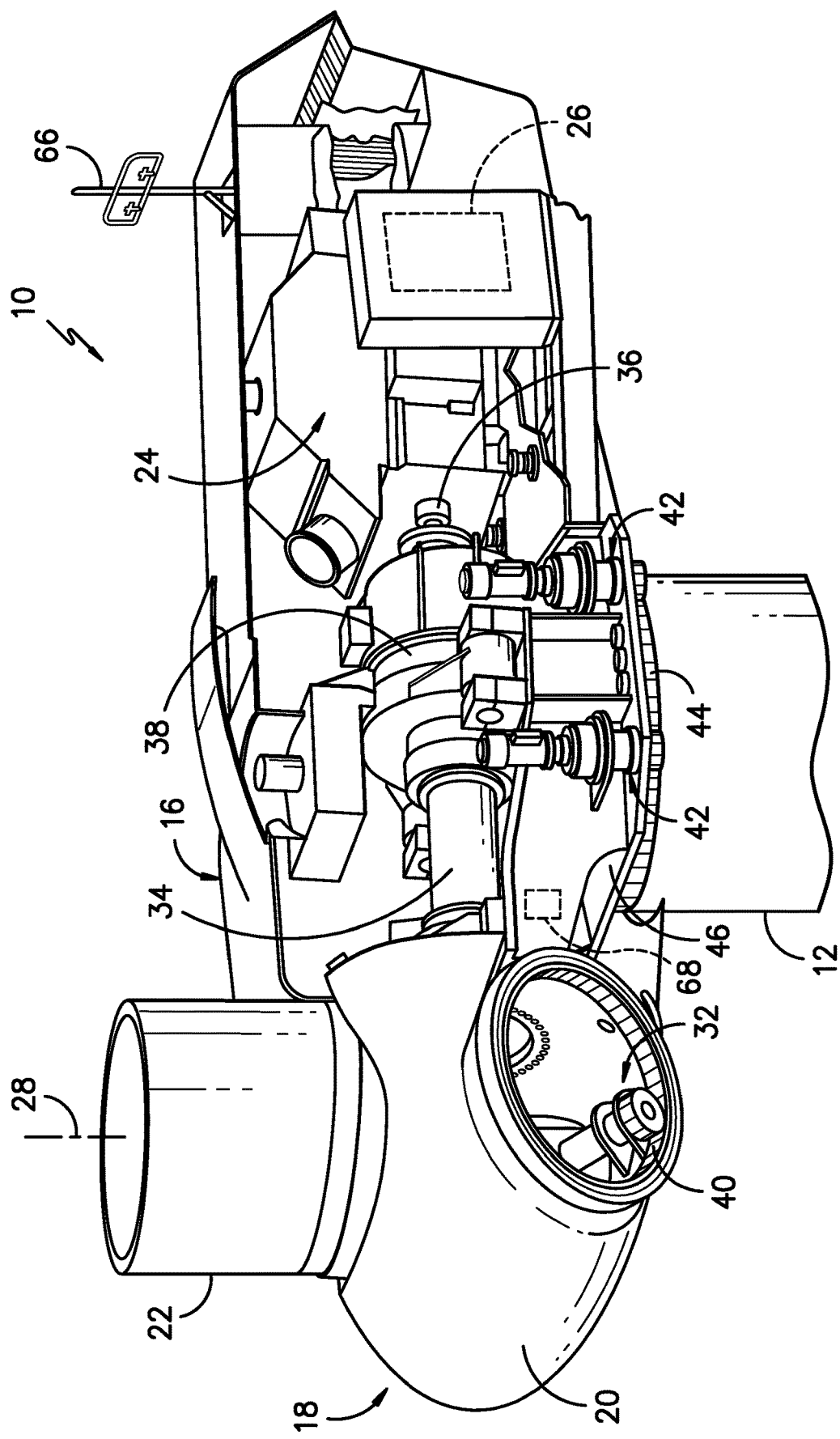
FIG. -5-

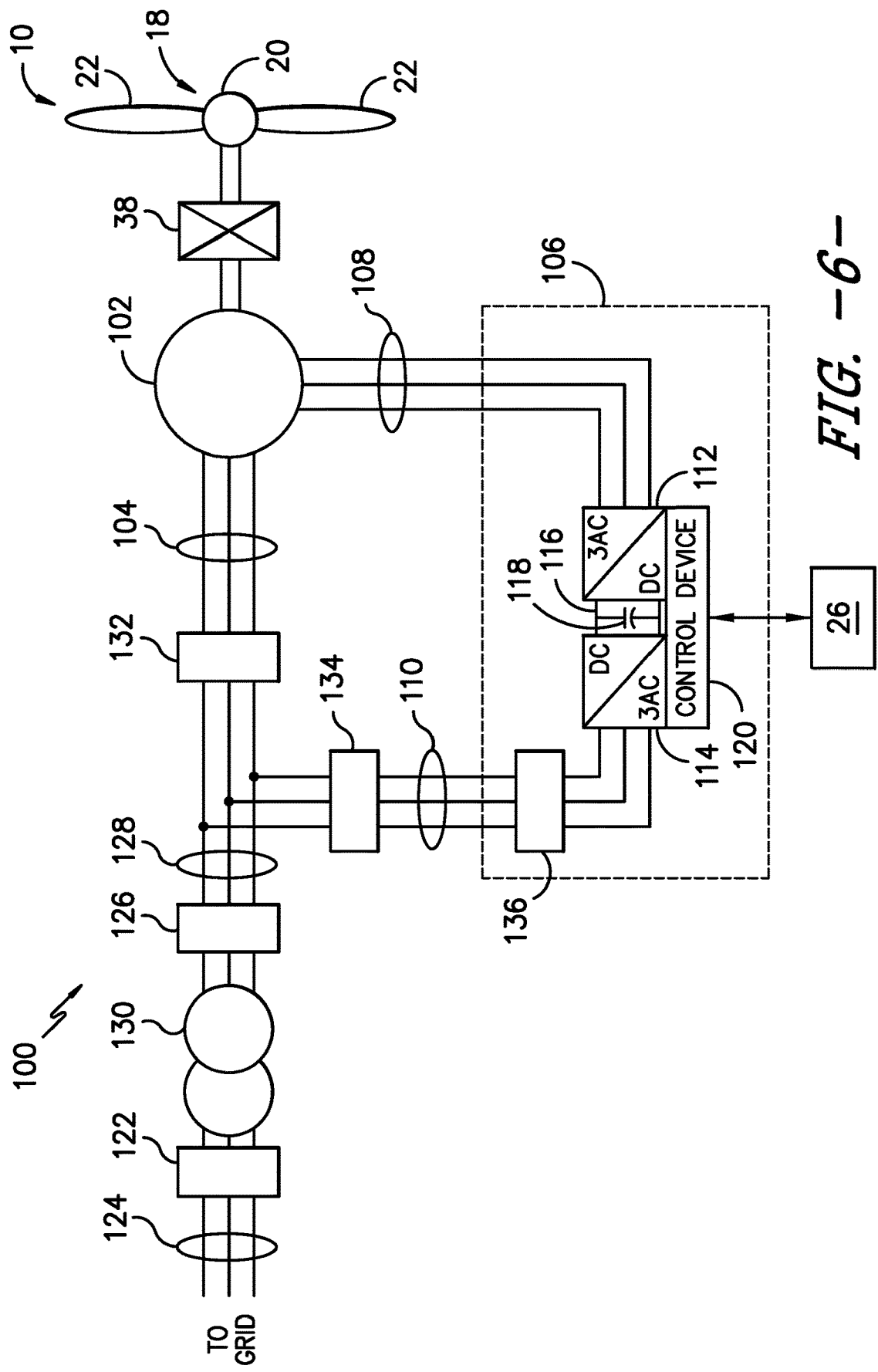
FIG. -6-

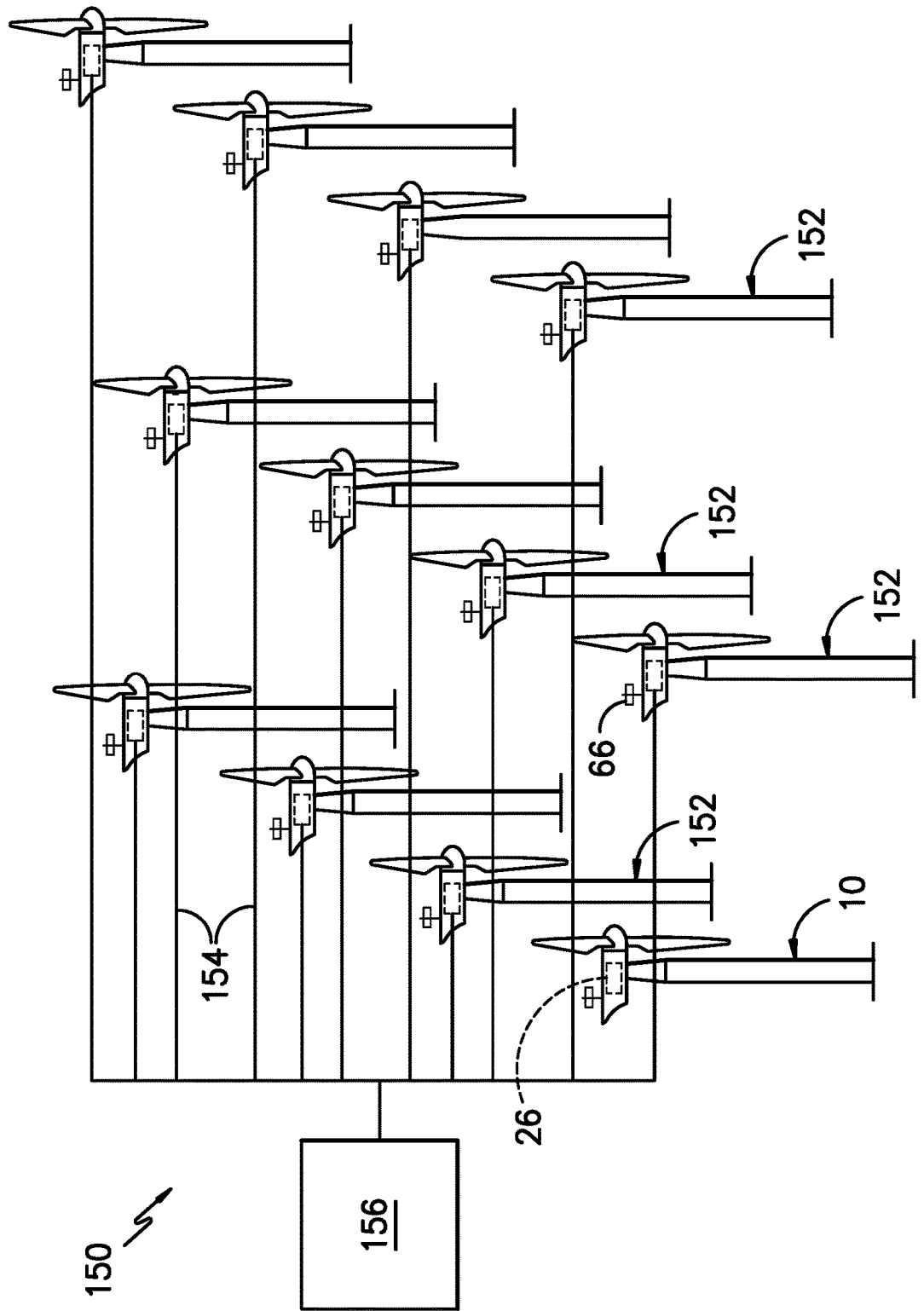
FIG. -7-

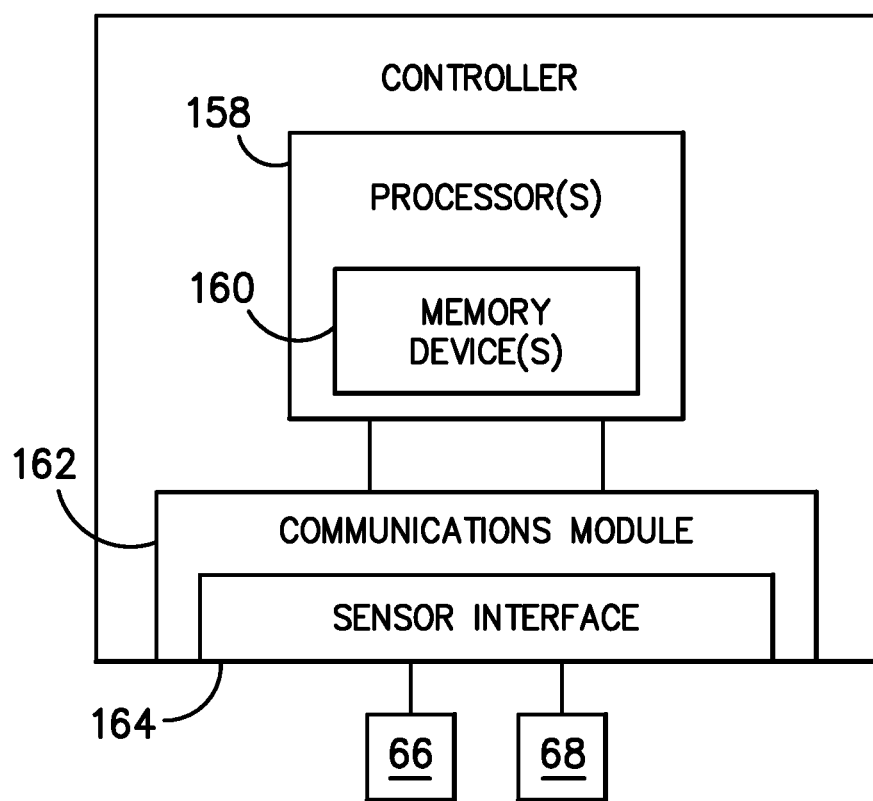
FIG. -8-

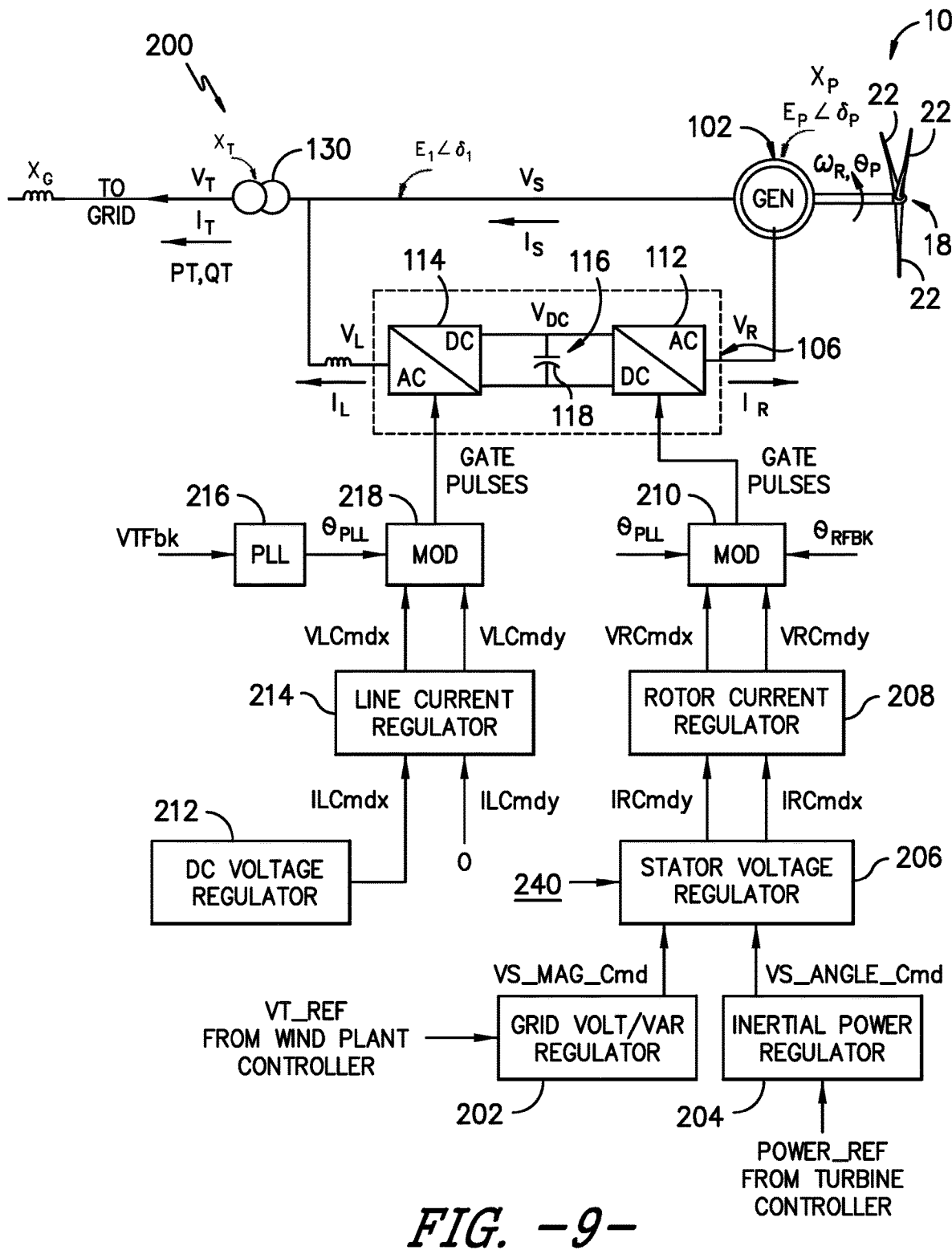
FIG. -9-

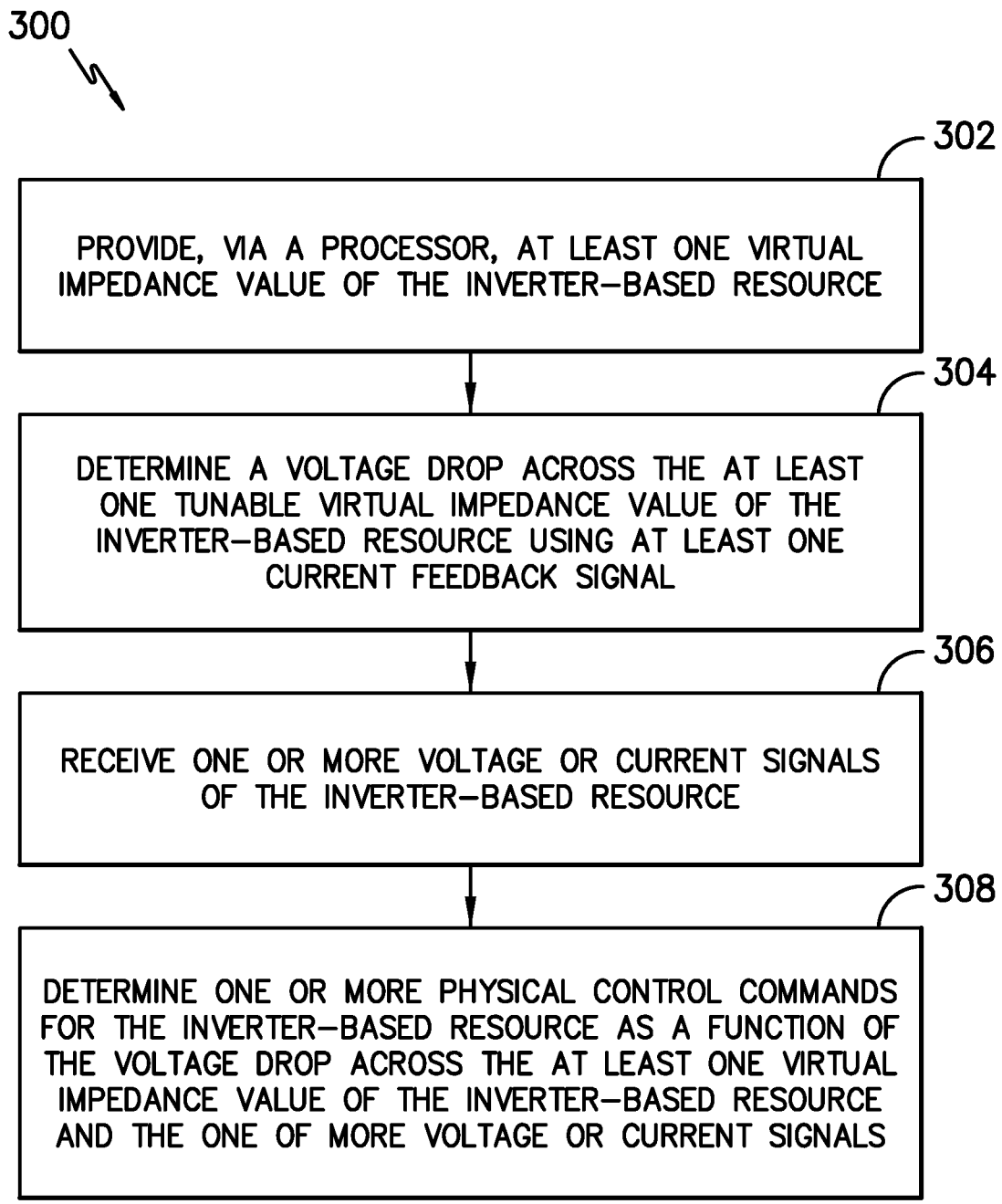
FIG. -10-

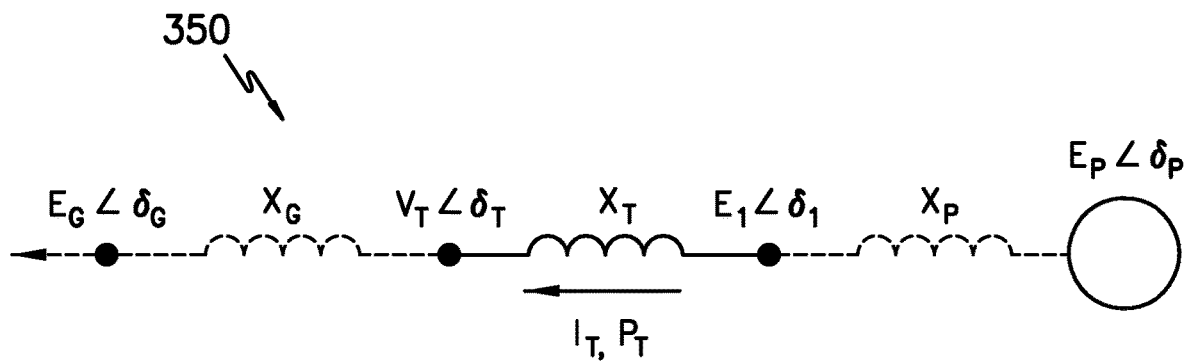
FIG. -11-
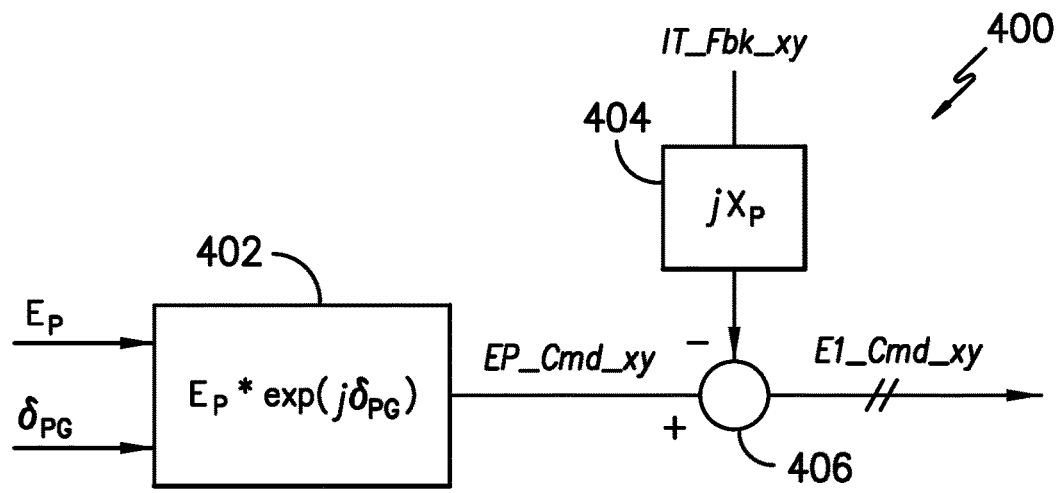
FIG. -12-

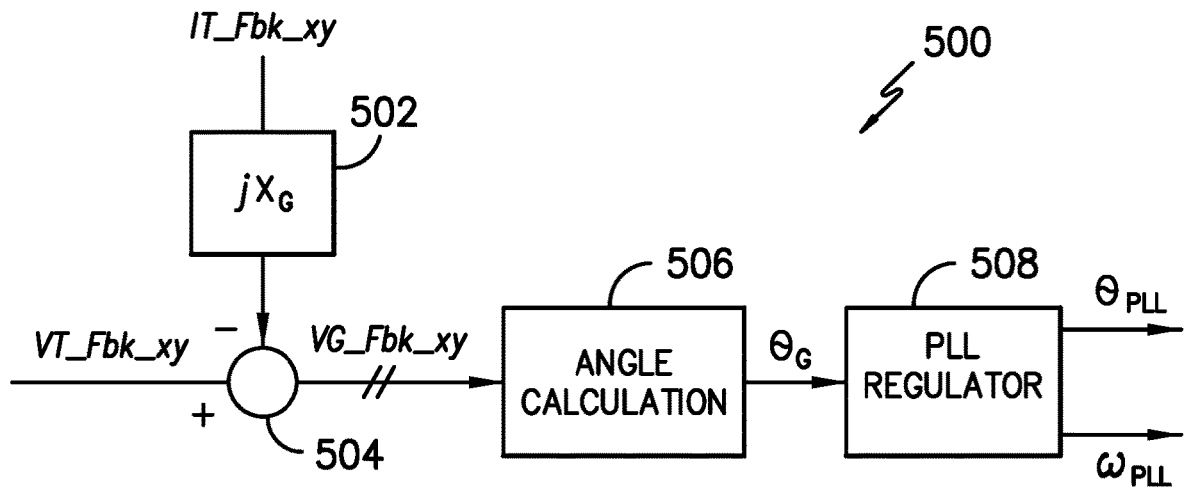
FIG. -13-
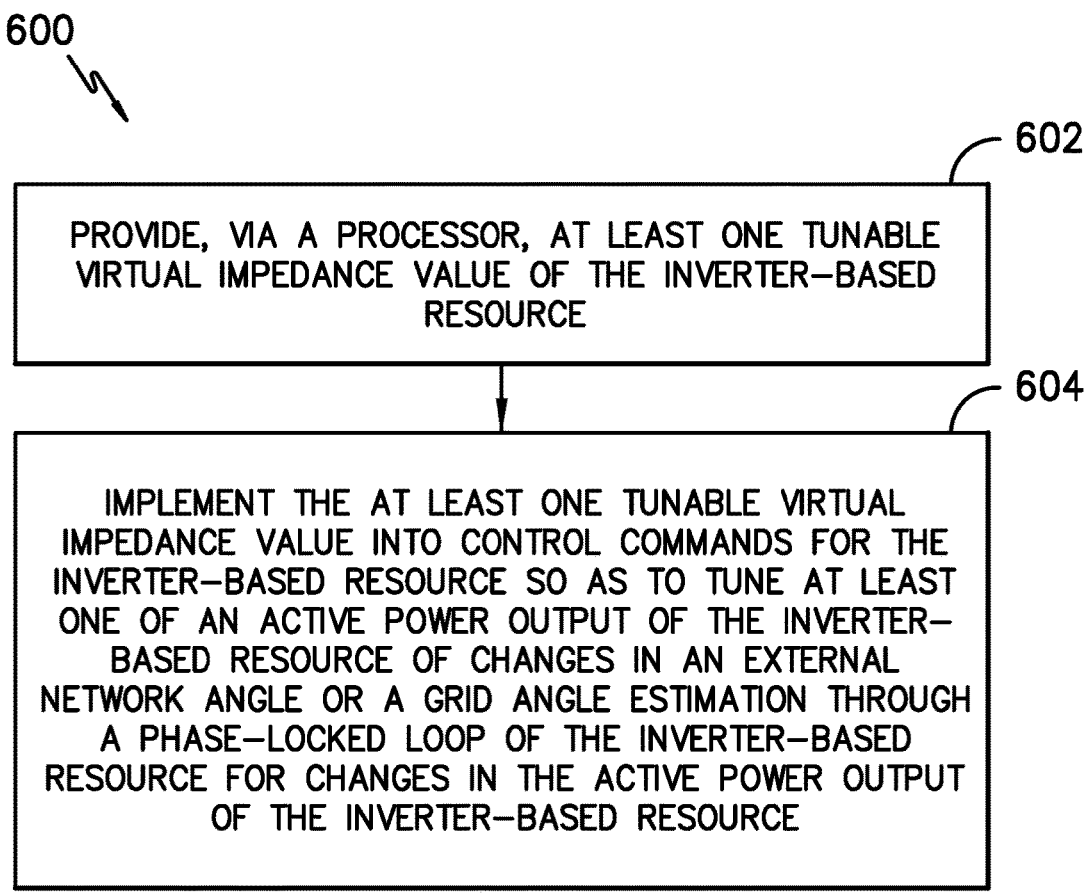
FIG. -14-

GRID-FORMING CONTROL OF INVERTER-BASED RESOURCE USING VIRTUAL IMPEDANCE

FIELD

The present disclosure relates generally to inverter-based resources and, more particularly, to systems and methods for providing grid-forming control of an inverter-based resource using a virtual impedance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g. the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) inverter-based resources (IBR) act as a voltage source behind an impedance and provide a voltage-source characteristic, where the angle and magnitude of the voltage are controlled to achieve the regulation functions needed by the grid. In particular, the impedance of the GFM IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

In particular, a simple circuit of a full-conversion grid-forming inverter-based resource connected to a grid is shown in FIG. 2, where the voltage $E_1$ and angle $\delta_1$ reflect quantities synthesized by the grid-forming resource and $X_{term}$ is the reactance of the grid-forming resource. The steady-state power flow in the system is characterized by the following relationship:

$$P_T=(E_1 V_{thev}/(X_{term}+X_{thev}))*\sin(\delta_1-\theta\text{th})\cong(E_1 V_{thev}/(X_{term}+X_{thev}))*(\delta_1-\theta\text{th}) \quad \text{Equation (1)}$$

The power generated by the grid-forming resource depends on the external grid voltage ($V_{thev}$) and grid impedance ($X_{thev}$), which are generally unknown and changing. Therefore, for conventional systems, control of the grid-forming resource is practically realized by controlling the voltage source with respect to a locally measured voltage and angle ($V_T$ and $\theta_T$). The active power equation can therefore be written as follows:

$$P_T=(E_1 V_T/X_{term})*\sin(\delta_{1T})\cong(E_1 V_T/X_{term})*\delta_{1T} \quad \text{Equation (2)}$$

where $\delta_{1T}$ reflects the difference between the grid-forming resource physical voltage angle and the locally measured angle. As such, the active power dynamics of the system are related to the impedance of the system as follows:

$$dP_T/d\delta_{1T} \alpha 1/X_{term} \qquad \text{Equation (3)}$$

Referring now to FIG. 3, a schematic diagram for controlling active power and voltage for an inverter-based resource is illustrated. As shown, output $E_1$ reflects the desired converter voltage magnitude and output $\delta_{1T}$ reflects the desired converter voltage angle with respect to a locally measured angle ($\theta_T$). Accordingly, the active power output and voltage are controlled through manipulation of the converter voltage so that the resulting voltage drop across the internal reactance ($X_{term}$) achieves the desired control objectives. This voltage drop is given by the following equation:

$$V_T = E_1 - j \ast X_{term} \ast I_T \qquad \text{Equation (4)}$$

The $X_{term}$, however, is dictated by the hardware of the power circuit and may include reactors and/or transformer impedance. Furthermore, with grid-forming control, current changes rapidly when there are grid disturbances. Therefore, for conventional systems, the control action is typically gradual to restore the steady-state operating conditions commanded by higher-level controls. The amount of current change is inversely related to the total impedance of the circuit. As such, if the current exceed limits, the control responds rapidly to force the current to be within limits. However, this drastic nonlinearity can cause chaotic behavior when applied to a grid consisting of many other similar systems. Alternatively, if the current change is too small, then the grid-forming system will not contribute as much as it could to support the grid.

Thus, the system and method of the present disclosure are configured so that the effective impedance can be set as a parameter independent of the equipment physical characteristics. In particular, the present disclosure is directed to a system and method for creating a configurable virtual impedance in the GFM IBR to add flexibility in tuning the dynamics of the system.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of an inverter-based resource connected to an electrical grid. The method includes providing, via a processor, at least one virtual impedance value of the inverter-based resource. The method also includes determining a voltage drop across the at least one virtual impedance value of the inverter-based resource using at least one current feedback signal. The voltage drop includes a voltage magnitude and a voltage angle. Further, the method includes receiving one or more voltage or current signals of the inverter-based resource. Moreover, the method includes determining a control signal for the inverter-based resource as a function of the voltage drop across the virtual impedance value(s) of the inverter-based resource and the one or more voltage or current signals.

In an embodiment, the virtual impedance value(s) may include, for example, an internal virtual impedance value at a node internal of the inverter-based resource or an external virtual impedance value at a node external of the inverter-based resource.

In one embodiment, for example, the virtual impedance value(s) may include the internal virtual impedance value. In such embodiments, the one or more voltage or current signals may include at least one of a virtual voltage magnitude command or a virtual voltage angle command behind the internal virtual impedance. Thus, in an embodiment, determining the control signal for the inverter-based resource as a function of the voltage drop across the at least one virtual impedance value of the inverter-based resource and the one or more voltage or current signals may include calculating a physical control command as a function of the virtual voltage magnitude command, the virtual voltage angle command, and the voltage drop. In another embodiment, calculating the physical control command for the inverter-based resource may include subtracting the voltage drop across the internal virtual impedance value from the virtual voltage command to obtain the physical control command for the inverter-based resource.

In further embodiments, the virtual impedance value(s) may include the external virtual impedance value. In such embodiments, the voltage or current signal(s) may include, for example, at least, a physical voltage feedback signal. Thus, in such embodiments, determining the control signal for the inverter-based resource as a function of the voltage drop across the virtual impedance value(s) of the inverter-based resource and the voltage or current signal(s) may include determining a remote, virtual voltage feedback signal as a function of the physical voltage feedback signal and the voltage drop.

In additional embodiments, determining the remote, virtual voltage feedback signal as a function of the physical voltage feedback signal and the voltage drop may include, for example, subtracting the voltage drop across the external virtual impedance value from the physical voltage feedback signal. Moreover, in an embodiment, determining the control signal for the inverter-based resource as a function of the voltage drop across the virtual impedance value(s) of the inverter-based resource and the voltage or current signal(s) may include calculating an angle input of the remote voltage feedback signal, providing the angle input to a phase-locked loop regulator of the inverter-based resource, and generating a phase-locked loop angle and a phase-locked loop frequency for the inverter-based resource based on the angle input.

In several embodiments, the inverter-based resource may be a wind turbine power system, a solar inverter, an energy storage system, a STATCOM, a hydro-power system, or an inverter-based system.

In another aspect, the present disclosure is directed to a method for providing grid-forming control of an inverter-based resource connected to an electrical grid. The method includes providing, via a processor, at least one virtual impedance value of the inverter-based resource. Further, the method includes implementing the virtual impedance value(s) into one or more control signals for the inverter-based resource so as to tune at least one of an active power output of the inverter-based resource for changes in an external network angle or a grid angle estimation through a phase-locked loop of the inverter-based resource for changes in the active power output of the inverter-based resource. It should be understood that the method may further include any of the additional features and/or steps described herein.

In yet another aspect, the present disclosure is directed to a system for providing grid-forming control of an inverter-based resource connected to an electrical grid. The system includes a controller having at least one processor. The processor(s) is configured to perform a plurality of operations, including but not limited to, providing at least one virtual impedance value of the inverter-based resource, and implementing the virtual impedance value(s) into one or more control signals for the inverter-based resource so as to tune at least one of an active power output of the inverter-based resource for changes in an external network angle or a grid angle estimation through a phase-locked loop of the inverter-based resource for changes in the active power output of the inverter-based resource. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a circuit diagram of one embodiment of a grid-connected grid-forming inverter-based resource according to conventional construction;

FIG. 3 illustrates a schematic diagram of one embodiment of power and voltage control of a grid-connected grid-forming inverter-based resource according to conventional construction;

FIG. 4 illustrates a perspective view of one embodiment of a wind turbine according to the present disclosure;

FIG. 5 illustrates a simplified, internal view of one embodiment of a nacelle according to the present disclosure;

FIG. 6 illustrates a schematic view of one embodiment of a wind turbine electrical power system suitable for use with the wind turbine shown in FIG. 4;

FIG. 7 illustrates a schematic view of one embodiment of a wind farm having a plurality of wind turbines according to the present disclosure;

FIG. 8 illustrates a block diagram of one embodiment of a controller according to the present disclosure;

FIG. 9 illustrates a one-line diagram of a double-fed wind turbine generator with converter controls for grid-forming application according to the present disclosure;

FIG. 10 illustrates a flow diagram of one embodiment of method for providing grid-forming control of an inverter-based resource connected to an electrical grid according to the present disclosure;

FIG. 11 illustrates an equivalent circuit of a full-conversion inverter-based resource with a virtual impedance according to the present disclosure;

FIG. 12 illustrates a schematic diagram of one embodiment of a control system for implementation of a full-conversion inverter-based resource with the internal virtual impedance value being used according to the present disclosure;

FIG. 13 illustrates a schematic diagram of one embodiment of a control system for implementation of a full-conversion inverter-based resource with the external virtual impedance value being used according to the present disclosure; and FIG. 14 illustrates a flow diagram of another embodiment of method for providing grid-forming control of an inverter-based resource connected to an electrical grid according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and method for providing grid-forming control for inverter-based resources that configure the controls so that an effective impedance can be set as a parameter independent of the equipment physical characteristics. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems. In one embodiment, effective impedance can be a fixed value determined by studies of the application scenario or may be a variable, e.g. as determined by a control logic that adapts to measured grid conditions. In addition, in one implementation, a larger effective impedance can be used to reduce the extreme nonlinearity associated with the rapid rise into the current limiting region, e.g. during a grid fault. Thus, upon fault clearing, the larger virtual impedance allows for inrush current to be within limits. After the grid fault, the virtual impedance may then be lowered as grid voltage recovers so that the converter contributes to supporting the grid while operating within its linear region. In another implementation, a lower effective impedance can be used to improve the support provided to the grid for milder events.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 5, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Referring now to FIG. 6, a schematic diagram of one embodiment of a wind turbine power system 100 is illustrated in accordance with aspects of the present disclosure. Although the present disclosure will generally be described herein with reference to the system 100 shown in FIG. 6, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 7, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g. through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Referring now to FIG. 8, a block diagram of one embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 58.

Referring now to FIG. 9, a schematic diagram of one embodiment of a system 200 for providing grid-forming control of a double-fed generator of a wind turbine according to the present disclosure is illustrated. More specifically, as shown, the system 200 may include many of the same features of FIG. 6 described herein, with components having the same reference characters representing like components. Further, as shown, the system 200 may include a control structure for controlling the line-side converter that is similar to the control structure shown in FIG. 6.

Moreover, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g. a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a control structure for controlling the rotor-side converter 112 using grid-forming characteristics. In particular, as shown in FIG. 9, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210.

In an embodiment, the grid volt/VAR regulator 202 receives a voltage reference (e.g. VT_REF) from the farm-level controller 156 and generates a stator voltage magnitude command (e.g. VS_Mag_Cmd), whereas the inertial power regulator receives a power reference from the turbine controller 26 and generates a stator voltage angle command (e.g. VS_Angle_Cmd). More specifically, in an embodiment, as shown, the stator voltage regulator 206 determines one or more rotor current commands (e.g. IRCmdy and IRCmdx) as a function of the stator voltage magnitude command, the stator voltage angle command, and/or a stator current feedback signal 240 of the double-fed generator 120. It should be understood that the stator feedback current 240 is a strong indicator of the characteristics of the externally connected power system, i.e. the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Feb Wind Turbine Generator," which is incorporated herein by reference in its entirety.

As mentioned, with grid-forming control, current changes rapidly when there are grid disturbances. Further, the control action is gradual to restore the steady-state operating conditions commanded by higher-level controls. The amount of current change is inversely related to the total impedance of the circuit. However, if the current exceeds limits, then the control responds rapidly to force the current to be within limits. This drastic nonlinearity can cause chaotic behavior when applied to a grid consisting of many other similar systems. Alternatively, if the current change is too small, then the grid-forming system will not contribute as much as it could to support the grid.

Therefore, the present disclosure is directed to a system and method that configures the controls so that the effective impedance can be set as a parameter independent of the equipment physical characteristics. Referring now to FIG. 10, a flow diagram of one embodiment of such a method 300 for providing grid-forming control of an inverter-based resource connected to an electrical grid using at least one virtual impedance according to the present disclosure is illustrated. It should be appreciated that the disclosed method 300 may be implemented with any suitable inverter-based resource having any suitable configuration. In several embodiments, for example, the inverter-based resource may be a wind turbine power system (e.g. having a full conversion power system or a dual-fed power conversion system as illustrated in FIG. 9), a solar inverter, an energy storage system, a STATCOM, a hydro-power system, or any other inverter-based system. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes providing, via a processor, at least one virtual impedance value of the inverter-based resource. As used herein, a tunable "virtual" impedance value generally refers to impedance behavior that can be mimicked by a system, rather than the impedance being provided by a particular component (such as an inductor). Thus, the virtual or effective impedance can be a fixed value determined by studies of the application scenario. Alternatively, the virtual impedance may be a variable, e.g. as determined by a control logic that adapts to measured grid conditions. In one embodiment, as an example, a larger effective impedance can be used to reduce the extreme nonlinearity associated with the rapid rise into the current limiting region, e.g. during a grid fault. Thus, upon fault clearing, the larger virtual impedance allows for inrush current to be within limits. After the grid fault, the virtual impedance may then be lowered as grid voltage recovers so that the converter contributes to supporting the grid while operating within its linear region. In addition, in an embodiment, a lower effective impedance can be used to improve the support provided to the grid for milder events.

For example, as shown in FIG. 11, an equivalent circuit 350 of a full-conversion inverter-based resource with a virtual impedance is illustrated. In particular, as shown, the components indicated in phantom are representative of "virtual" components in that, such components are not actual hardware of the inverter-based resource, but rather, are provided or mimicked using software of the resource. Moreover, as shown in the illustrated embodiment, the virtual impedance value(s) may include, for example, an internal virtual impedance value $X_P$ at a node internal of the inverter-based resource and/or an external virtual impedance value $X_G$ at a node external of the inverter-based resource. Thus, in certain embodiments, two virtual impedances may be implemented, each with a certain purpose as related to the active power dynamics of the system. For example, in an embodiment, the internal virtual impedance may allow for tuning an active power output of the inverter-based resource for changes in external network angle. In another embodiment, the external virtual impedance may allow for tuning of a grid angle estimation through the phase-locked loop for changes in active power output of the grid-forming resource. In such embodiments, the multiple degrees of freedom allow for configuration and tuning of active power dynamics for grid-forming converter controls with various hardware types as well as various types of external networks.

In addition, as shown in FIG. 11, the voltage magnitude and angle used to control the active power and voltage of the grid-forming inverter-based resource are the synthesized voltage magnitude $E_P$ and angle $\delta_P$ behind the internal virtual impedance $X_P$. In such embodiments, this voltage reflects an artificial node internal to the inverter-based resource. Moreover, the voltage magnitude and angle used as the reference for the controls are referred to in FIG. 11 as $V_G$ and $\delta_G$. This voltage reflects a node further into the external network outside of the inverter-based resource. The voltages $E_1 \angle \delta_1$ and $V_T \angle \delta_T$ represent the physical converter voltage and angle and grid-forming terminal voltage and angle, respectively. The equivalent impedance of this system represents the series combination of the hardware impedance $X_T$ (which is associated with a current $I_T$ and $P_T$ flow therethrough), the internal virtual impedances $X_P$, and the external virtual impedance $X_G$, given by Equation (5) below:

$$X_{term} = X_T + X_P + X_G \qquad \text{Equation (5)}$$

The converter voltage can be calculated from the synthesized voltage and virtual impedance by Equation (6) below:

$$E_1 = E_P - j^* X_P^* I_T \qquad \text{Equation (6)}$$

The remote voltage can be calculated from the terminal voltage by Equation (7) below:

$$V_G = V_T - j^* X_G^* I_T \qquad \text{Equation (7)}$$

Referring back to FIG. 10, as shown at (304), the method 300 also includes determining a voltage drop across the at least one virtual impedance value of the inverter-based resource using at least one current feedback signal. In such embodiments, the voltage drop includes a voltage magnitude and a voltage angle. As shown at (306), the method 300 includes receiving one or more voltage or current signals of the inverter-based resource. In addition, as shown at (308), the method 300 includes determining at least one control signal for the inverter-based resource as a function of the voltage drop across the virtual impedance value(s) of the inverter-based resource and the one or more voltage or current signals. Such method steps can be better understood with respect to the control diagrams of FIGS. 12 and 13, which are described and explained in more detail below.

Referring particularly to FIG. 12, a schematic diagram of one embodiment of a control system 400 for implementation of a full-conversion inverter-based resource with the internal virtual impedance value being used is illustrated. Thus, as shown, the voltage or current signals (e.g. the inputs of the system 400) may include at least one of a synthesized voltage magnitude $E_P$ or a physical voltage angle $\delta_{PG}$. More specifically, in an embodiment, the synthesized voltage magnitude $E_P$ or a physical voltage angle $\delta_{PG}$ may be the outputs from the grid volt/VAR regulator 202 and the inertial power regulator 204 (FIG. 9), respectively. Thus, synthesized values, as used herein, generally refer to parameters generating by an outside control loop of the inverter-based resource, and are thus not measurable, but rather, are typically simulated in the controls. Accordingly, as shown at 402 of FIG. 12, the system 400 may determine or calculate calculating a physical voltage command (e.g. EP_Cmd_xy) as a function of the synthesized voltage magnitude EP and the physical voltage angle $\delta_{PG}$. More specifically, as shown, the system 400 may calculate the physical voltage command using Equation (8) below:

$$EP\_Cmd\_xy = E_P^* \exp(j\delta_{PG}) \qquad \text{Equation (8)}$$

In addition, as shown at 404, the system 400 is configured to determine the voltage drop across the internal virtual impedance value $X_P$ of the inverter-based resource using current feedback signal IT_Fbk_xy. Thus, as shown at 406, the voltage drop can be subtracted from the physical voltage command to determine the voltage command (e.g. E1_Cmd_xy) for the inverter-based resource.

Referring particularly to FIG. 13, a schematic diagram of one embodiment of a control system 500 for implementation of a full-conversion inverter-based resource with the external virtual impedance value being used is illustrated. Thus, as shown, the voltage or current signals (e.g. the inputs of the system 500) may include, for example, at least, a physical voltage feedback signal VT_Fbk_xy. In addition, as shown at 502, the system 500 is configured to determine the voltage drop across the external virtual impedance value $X_G$ of the inverter-based resource using current feedback signal IT_Fbk_xy. Thus, as shown at 504, the voltage drop can be subtracted from the physical voltage feedback signal VT_Fbk_xy to determine a remote voltage feedback signal VG_Fbk_xy for the inverter-based resource.

Thus, in such embodiments, as shown at 506, the system 500 may then calculate an angle input $\theta_G$ of the remote voltage feedback signal and provide the angle input $\theta_G$ to a phase-locked loop regulator 508 of the inverter-based resource. Accordingly, as shown, the phase-locked loop regulator 508 is configured to generate a phase-locked loop angle $\theta_{PLL}$ and a phase-locked loop frequency $\omega_{PLL}$ for the inverter-based resource based on the angle input.

Referring now to FIG. 14, a flow diagram of another embodiment of a method 600 for providing grid-forming control of an inverter-based resource connected to an electrical grid using at least one virtual impedance according to the present disclosure is illustrated. It should be appreciated that the disclosed method 600 may be implemented with any suitable inverter-based resource having any suitable configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 includes providing, via a processor, at least one virtual impedance value of the inverter-based resource. As shown at (604), the method 600 includes implementing the virtual impedance value(s) into control signals for the inverter-based resource so as to tune at least one of an active power output of the inverter-based resource for changes in an external network angle or a grid angle estimation through a phase-locked loop of the inverter-based resource for changes in the active power output of the inverter-based resource.

Further aspects of the invention are provided by the subject matter of the following clauses:

Clause 1. A method for providing grid-forming control of an inverter-based resource connected to an electrical grid, the method comprising:

providing, via a processor, at least one virtual impedance value of the inverter-based resource;

determining a voltage drop across the at least one virtual impedance value of the inverter-based resource using at least one current feedback signal, the voltage drop comprising a voltage magnitude and a voltage angle;

receiving one or more voltage or current signals of the inverter-based resource; and, determining a control signal for the inverter-based resource as a function of the voltage drop across the at least one virtual impedance value of the inverter-based resource and the one or more voltage or current signals.

Clause 2. The method of clause 1, wherein the at least one virtual impedance value comprises at least one of an internal virtual impedance value at a node internal of the inverter-based resource or an external virtual impedance value at a node external of the inverter-based resource.

Clause 3. The method of clause 2, wherein the at least one virtual impedance value comprises the internal virtual impedance value, and wherein the one or more voltage or current signals comprise at least one of a virtual voltage magnitude command or a virtual voltage angle command behind the internal virtual impedance.

Clause 4. The method of clause 3, wherein determining the control signal for the inverter-based resource as a function of the voltage drop across the at least one virtual impedance value of the inverter-based resource and the one or more voltage or current signals further comprises:

calculating a physical control command as a function of the virtual voltage magnitude command, the virtual voltage angle command, and the voltage drop.

Clause 5. The method of clause 4, wherein calculating the physical control command for the inverter-based resource further comprises:

subtracting the voltage drop across the internal virtual impedance value from the virtual voltage command to obtain the physical control command for the inverter-based resource.

Clause 6. The method of clause 2, wherein the at least one virtual impedance value comprises the external virtual impedance value, and wherein the one or more voltage or current signals comprises, at least, a physical voltage feedback signal.

Clause 7. The method of clause 6, wherein determining the control signal for the inverter-based resource as a function of the voltage drop across the at least one virtual impedance value of the inverter-based resource and the one or more voltage or current signals further comprises:

determining a remote, virtual voltage feedback signal as a function of the physical voltage feedback signal and the voltage drop.

Clause 8. The method of clause 7, wherein determining the remote, virtual voltage feedback signal as a function of the physical voltage feedback signal and the voltage drop further comprises:
subtracting the voltage drop across the external virtual impedance value from the physical voltage feedback signal.

Clause 9. The method of clause 7, wherein determining the control signal for the inverter-based resource as a function of the voltage drop across the at least one virtual impedance value of the inverter-based resource and the one or more voltage or current signals further comprises:

calculating an angle input of the remote voltage feedback signal;

providing the angle input to a phase-locked loop regulator of the inverter-based resource; and generating a phase-locked loop angle and a phase-locked loop frequency for the inverter-based resource based on the angle input.

Clause 10. The method of any of the preceding clauses, wherein the inverter-based resource comprises at least one of a wind turbine power system, a solar inverter, an energy storage system, a STATCOM, or a hydro-power system.

Clause 11. A method for providing grid-forming control of an inverter-based resource connected to an electrical grid, the method comprising: providing, via a processor, at least one virtual impedance value of the inverter-based resource; and, implementing the at least one virtual impedance value into one or more control signals for the inverter-based resource so as to tune at least one of an active power output of the inverter-based resource for changes in an external network angle or a grid angle estimation through a phase-locked loop of the inverter-based resource for changes in the active power output of the inverter-based resource.

Clause 12. The method of clause 11, wherein the at least one virtual impedance value comprises at least one of an internal virtual impedance value at a node internal of the inverter-based resource or an external virtual impedance value at a node external of the inverter-based resource.

Clause 13. The method of clauses 11-12, wherein the inverter-based resource comprises at least one of a wind turbine power system, a solar inverter, an energy storage system, a STATCOM, or a hydro-power system.

Clause 14. A system for providing grid-forming control of an inverter-based resource connected to an electrical grid, the system comprising:

a controller comprising at least one processor, the at least one processor configured to perform a plurality of operations, the plurality of operations comprising:

providing at least one virtual impedance value of the inverter-based resource; and, implementing the at least one virtual impedance value into one or more control signals for the inverter-based resource so as to tune at least one of an active power output of the inverter-based resource for changes in an external network angle or a grid angle estimation through a phase-locked loop of the inverter-based resource for changes in the active power output of the inverter-based resource.

Clause 15. The system of clause 14, wherein the at least one virtual impedance value comprises at least one of an internal virtual impedance value at a node internal of the inverter-based resource or an external virtual impedance value at a node external of the inverter-based resource.

Clause 16. The system of clause 15, further comprising determining a voltage drop across the at least one virtual impedance value of the inverter-based resource using at least one current feedback signal.

Clause 17. The system of clause 16, wherein the at least one virtual impedance value comprises the internal virtual impedance value, wherein implementing the at least one virtual impedance value into the one or more control signals for the inverter-based resource further comprises:

calculating a physical control command as a function of the virtual voltage magnitude command, the virtual voltage angle command, and the voltage drop.

Clause 18. The system of clause 17, wherein the at least one virtual impedance value comprises the external virtual impedance value, wherein implementing the at least one virtual impedance value into the one or more control signals for the inverter-based resource further comprises:

determining a remote, virtual voltage feedback signal as a function of a physical voltage feedback signal and the voltage drop.

Clause 19. The system of clause 18, wherein determining the remote, virtual voltage feedback signal as a function of the physical voltage feedback signal and the voltage drop further comprises:

subtracting the voltage drop across the external virtual impedance value from the physical voltage feedback signal.

Clause 20. The system of clauses 18-19, wherein implementing the at least one virtual impedance value into the one or more control signals for the inverter-based resource further comprises:

calculating an angle input of the remote voltage feedback signal;

providing the angle input to a phase-locked loop regulator of the inverter-based resource; and generating a phase-locked loop angle and a phase-locked loop frequency for the inverter-based resource based on the angle input.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming control of an inverter-based resource connected to an electrical grid, the method comprising:
   providing the inverter-based resource, the inverter-based resource comprising:
      a generator or absorber of electrical power,
      a grid-forming terminal, and
      grid-forming converter controls;
   providing, via a processor, a virtual impedance value, $X_P$, at a node between the generator or absorber of electrical power and the grid-forming terminal and a virtual impedance value, $X_G$, at a node between the grid-forming terminal and a remote virtual voltage;
   determining a voltage drop across virtual impedance values, $X_P$ and $X_G$, using at least one current feedback signal, wherein the voltage drop comprises a voltage magnitude and a voltage angle;
   receiving one or more voltage or current signals of the inverter-based resource, wherein the one or more voltage or current signals comprises, at least, a virtual voltage magnitude or a virtual voltage angle of the generator or absorber of electrical power; and,
   determining a control signal for the inverter-based resource as a function of the voltage drop and the one or more voltage or current signals, wherein determining the control signal for the inverter-based resource further comprises:
      calculating a control command for the inverter-based resource as a function of a virtual voltage command comprising a virtual voltage magnitude command, a virtual voltage angle command, and a voltage drop by subtracting the voltage drop across the virtual impedance value, $X_P$, from the virtual voltage command to obtain the control command for the inverter-based resource.

2. The method of claim 1, wherein the one or more voltage or current signals for the virtual impedance value, $X_G$, comprises, at least, a physical voltage feedback signal.

3. The method of claim 2, wherein determining the control signal for the inverter-based resource as a function of the voltage drop across the virtual impedance value, $X_G$, and the one or more voltage or current signals further comprises:
   determining a remote, virtual voltage feedback signal as a function of the physical voltage feedback signal and the voltage drop.

4. The method of claim 3, wherein determining the remote, virtual voltage feedback signal as a function of the physical voltage feedback signal and the voltage drop further comprises:
   subtracting the voltage drop across the virtual impedance value, $X_G$, from the physical voltage feedback signal.

5. The method of claim 3, wherein determining the control signal for the inverter-based resource as a function of the voltage drop across the virtual impedance value, $X_G$, and the one or more voltage or current signals further comprises:
   calculating an angle input of the remote voltage feedback signal;
   providing the angle input to a phase-locked loop regulator of the inverter-based resource; and
   generating a phase-locked loop angle and a phase-locked loop frequency for the inverter-based resource based on the angle input.

6. The method of claim 1, wherein the inverter-based resource comprises at least one of a wind turbine power system, a solar inverter, an energy storage system, a STATCOM, or a hydro-power system.

7. A method for providing grid-forming control of an inverter-based resource connected to an electrical grid, the method comprising:
   providing the inverter-based resource, the inverter-based resource comprising:
      a generator or absorber of electrical power,
      a grid-forming terminal, and
      grid-forming converter controls;
   providing, via a processor, a virtual impedance value, $X_P$, at a node between the generator or absorber of electrical power and the grid-forming terminal physical converter and a virtual impedance value, $X_G$, at a node between the grid-forming terminal and a remote virtual voltage;
   determining a voltage drop across virtual impedance values, $X_P$ and $X_G$ using at least one current feedback signal;
   receiving one or more voltage or current signals of the inverter-based resource, wherein the one or more voltage or current signals comprises, at least, a physical voltage feedback signal; and,
   determining a control signal for the inverter-based resource as a function of the voltage drop and the one or more voltage or current signals, wherein determining the control signal comprises:
      determining a remote, virtual voltage feedback signal as a function of the physical voltage feedback signal and the voltage drop by subtracting the voltage drop across the virtual impedance value, $X_G$, from the physical voltage feedback signal.

8. The method of claim 7, wherein the inverter-based resource comprises at least one of a wind turbine power system, a solar inverter, an energy storage system, a STATCOM, or a hydro-power system.

9. A system for providing grid-forming control of an inverter-based resource connected to an electrical grid, the system comprising:
   the inverter-based resource, the inverter-based resource comprising:
      a generator or absorber of electrical power,
      a grid-forming terminal, and
      grid-forming converter controls, and;
   a controller comprising at least one processor, the at least one processor configured to perform a plurality of operations, the plurality of operations comprising:
      providing, via a processor, a virtual impedance value, $X_P$, at a node between the generator or absorber of electrical power and the grid-forming terminal and a virtual impedance value, $X_G$, at a node between the grid-forming terminal and a remote virtual voltage ;

determining a voltage drop across the virtual impedance values, $X_P$ and $X_G$ using at least one current feedback signal and, implementing the virtual impedances, $X_P$ and $X_G$, into one or more control signals for the inverter-based resource so as to tune at least one of an active power output of the inverter-based resource for changes in an angle for a network outside of the inverter-based resource or decoupling grid angle estimation through a phase-locked loop of the inverter-based resource for changes in the active power output of the inverter-based resource, wherein implementing the virtual impedances comprises:

calculating a control command for the inverter-based resource as a function of a virtual voltage command comprising a virtual voltage magnitude command, a virtual voltage angle command, and the voltage drop; and determining a remote, virtual voltage feedback signal as a function of a physical voltage feedback signal and the voltage drop;

calculating an angle of the remote voltage feedback signal;

providing the angle to a phase-locked loop regulator of the inverter-based resource; and generating a phase-locked loop angle and a phase-locked loop frequency for the inverter-based resource based on the angle input.

10. The system of claim 9, wherein determining the remote, virtual voltage feedback signal as a function of the physical voltage feedback signal and the voltage drop further comprises:

subtracting the voltage drop across the virtual impedance value $X_G$, from the physical voltage feedback signal.

* * * * *